United States Patent
Zahid et al.

(10) Patent No.: US 10,187,310 B2
(45) Date of Patent: *Jan. 22, 2019

(54) SYSTEM AND METHOD FOR EFFICIENT NETWORK ISOLATION AND LOAD BALANCING IN A MULTI-TENANT CLUSTER ENVIRONMENT

(71) Applicant: ORACLE INTERNATIONAL CORPORATION, Redwood Shores, CA (US)

(72) Inventors: Feroz Zahid, Oslo (NO); Ernst Gunnar Gran, Oslo (NO); Bartosz Bogdanski, Oslo (NO); Bjørn Dag Johnsen, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 265 days.

This patent is subject to a terminal disclaimer.

(21) Appl. No.: 15/182,383

(22) Filed: Jun. 14, 2016

(65) Prior Publication Data

US 2017/0104682 A1 Apr. 13, 2017

Related U.S. Application Data

(60) Provisional application No. 62/240,986, filed on Oct. 13, 2015, provisional application No. 62/242,211, filed on Oct. 15, 2015.

(51) Int. Cl.
*H04L 12/26* (2006.01)
*H04L 12/803* (2013.01)
(Continued)

(52) U.S. Cl.
CPC .......... *H04L 47/125* (2013.01); *G06F 9/5077* (2013.01); *G06F 17/30873* (2013.01);
(Continued)

(58) Field of Classification Search
None
See application file for complete search history.

(56) References Cited

U.S. PATENT DOCUMENTS 5,732,072 A 3/1998 Thanner et al.
8,364,891 B2 1/2013 Margolus et al.
(Continued)

FOREIGN PATENT DOCUMENTS

WO 2012167268 A1 12/2012

OTHER PUBLICATIONS

European Patent Office, International Searching Authority, International Search Report and Written Opinion dated Dec. 2, 2016 for International Patent Application No. PCT/US2016/050992, 24 Pages.

(Continued)

*Primary Examiner* — Bob A Phunkulh
(74) *Attorney, Agent, or Firm* — Tucker Ellis LLP

(57) ABSTRACT

A system and method for supporting network isolation in a multi-tenant cluster environment. An exemplary method can support one or more tenants, and can associate each of the one or more tenants with a partition of a plurality of partitions, and can also associate each of the plurality of partitions with one or more nodes of a plurality of nodes, each of the plurality of nodes being associated with a leaf switch of a plurality of switches. The method can mark each of the plurality of partitions with a policy parameter. The method can assign each node of the plurality of nodes a partitioning order based on the marked on the partition associated with each node. Finally, the method can, based at least upon the marking of the partition of the plurality of partitions, generate one or more linear forwarding tables for use in the multi-tenant cluster environment.

20 Claims, 13 Drawing Sheets

(51) Int. Cl.
  *G06F 17/30* (2006.01)
  *H04L 12/931* (2013.01)
  *H04L 29/08* (2006.01)
  *G06F 9/50* (2006.01)
  *H04L 12/725* (2013.01)
  *H04L 12/701* (2013.01)

(52) U.S. Cl.
  CPC .......... *H04L 45/302* (2013.01); *H04L 49/358* (2013.01); *H04L 67/1004* (2013.01); *H04L 45/00* (2013.01); *H04L 49/503* (2013.01); *H04L 49/70* (2013.01)

(56) References Cited

U.S. PATENT DOCUMENTS

| | | | |
|---|---|---|---|
| 9,014,201 B2 | 4/2015 | Bogdanski | |
| 2013/0039169 A1* | 2/2013 | Schlansker | H04L 45/48 370/225 |
| 2013/0227097 A1 | 8/2013 | Yasuda et al. | |
| 2014/0074558 A1 | 3/2014 | Jain et al. | |
| 2014/0101302 A1* | 4/2014 | Yang | H04L 41/0813 709/224 |
| 2014/0101336 A1* | 4/2014 | Yang | H04L 45/02 709/244 |
| 2014/0369345 A1* | 12/2014 | Yang | H04L 12/18 370/355 |
| 2015/0074246 A1* | 3/2015 | Premji | H04L 41/0886 709/220 |
| 2015/0092561 A1* | 4/2015 | Sigoure | H04L 49/50 370/236 |
| 2015/0127701 A1* | 5/2015 | Chu | H04L 45/22 709/201 |
| 2016/0094661 A1 | 3/2016 | Jain et al. | |
| 2016/0112314 A1 | 4/2016 | de Silva et al. | |
| 2016/0334998 A1 | 11/2016 | George et al. | |
| 2017/0012859 A1 | 1/2017 | Ye et al. | |
| 2017/0026233 A1* | 1/2017 | Boutros | H04L 41/0806 |
| 2017/0104682 A1 | 4/2017 | Zahid et al. | |

OTHER PUBLICATIONS

Zahid Feroz et al., "A weighted fat-tree routing algorithm for efficient load-balancing in InfiniBand enterprise clusters", 2015 23rd Euromicro International Conference on Parallel, Distributed, and Network-Based Processing, 8 pages.

Zahid Feroz et al., "Partition-aware routing to improve network isolation in InfiniBand based multi-tenant clusters", 2015 15th IEEE/ACM International Symposium on Cluster, Cloud and Grid Computing, 10 pages.

United States Patent and Trademark Office, Notice of Allowance dated Jun. 27, 2017 for U.S. Appl. No. 14/927,085, 7 Pages.

United States Patent and Trademark Office, Notice of Allowance dated Mar. 27, 2018 for U.S. Appl. No. 15/182,397, 8 Pages.

* cited by examiner

SYSTEM AND METHOD FOR EFFICIENT NETWORK ISOLATION AND LOAD BALANCING IN A MULTI-TENANT CLUSTER ENVIRONMENT

CLAIM OF PRIORITY AND CROSS REFERENCE TO RELATED APPLICATIONS

This application claims the benefit of priority to U.S. Provisional Application titled "SYSTEM AND METHOD FOR EFFICIENT NETWORK ISOLATION AND LOAD BALANCING IN A MULTI-TENANT CLUSTER ENVIRONMENT", Application No. 62/240,986, filed Oct. 13, 2015; and U.S. Provisional Application titled "SYSTEM AND METHOD FOR EFFICIENT NETWORK ISOLATION AND LOAD BALANCING IN A MULTI-TENANT CLUSTER ENVIRONMENT", Application No. 62/242,211, filed Oct. 15, 2015; and is related to U.S. patent application entitled "SYSTEM AND METHOD FOR EFFICIENT NETWORK ISOLATION AND LOAD BALANCING IN A MULTI-TENANT CLUSTER ENVIRONMENT", application Ser. No. 15/182,397 filed concurrently herewith on Jun. 14, 2016, which applications are herein incorporated by referenced.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a multi-tenant cluster environment.

BACKGROUND

Multi-tenancy promises high utilization of available system resources and helps maintain cost-effective operations for service providers. However, multi-tenant high-performance computing (HPC) infrastructures bring unique challenges, both associated with providing performance isolation to the tenants, and achieving efficient load-balancing across the network fabric.

SUMMARY

A system and method for supporting network isolation in a multi-tenant cluster environment. An exemplary method can support one or more tenants within the multi-tenant cluster environment. The method can associate each of the one or more tenants with a partition of a plurality of partitions, and can also associate each of the plurality of partitions with one or more nodes of a plurality of nodes, each of the plurality of nodes being associated with a leaf switch of a plurality of switches, the plurality of switches comprising a plurality of leaf switches and at least one switch at another level. The method can mark each of the plurality of partitions with a policy parameter of a plurality of policy parameters. The method can assign each node of the plurality of nodes a partitioning order, wherein the partitioning order is at least based on policy parameter marked on the partition associated with each node. Finally, the method can, based at least upon the marking of the partition of the plurality of partitions, generate one or more linear forwarding tables for use in the multi-tenant cluster environment.

DETAILED DESCRIPTION

Figure 1:
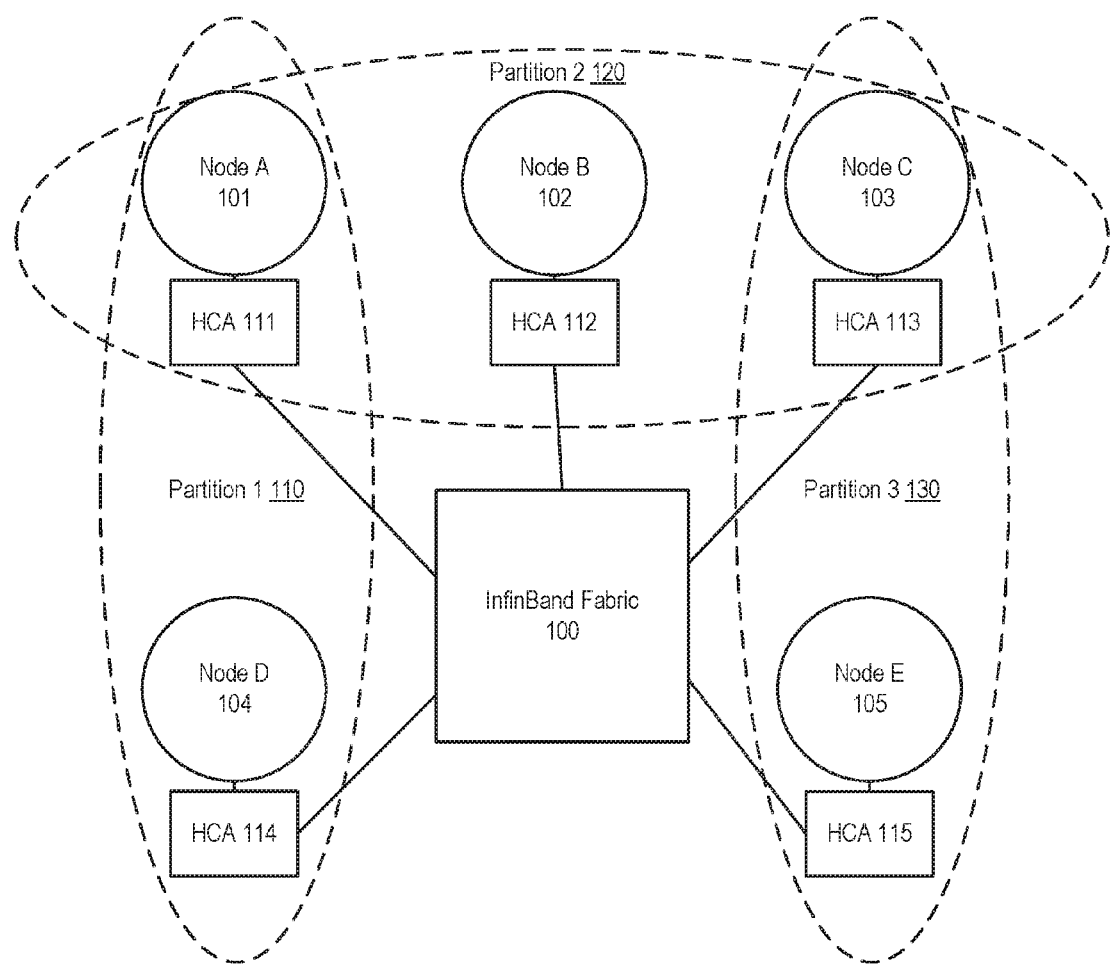
FIG. 1 shows an illustration of a multi-tenant cluster environment, in accordance with an embodiment.

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals are used to indicate like elements throughout the drawings and detailed description; therefore, reference numerals used in a figure may or may not be referenced in the detailed description specific to such figure if the element is described elsewhere.

The following description of the invention uses an Infiniband™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards HPC applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts are connected using switches and point-to-point links. Additionally, there is one master management entity, the subnet manager (SM), which resides on a designated subnet device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet is limited to 49151 LIDs. Besides the LIDs, which are the local addresses that are valid within a subnet, each IB device can have a 64-bit global unique identifier (GUID) that is burned into its non-volatile memory. A GUID can be used to form a global identifier (GID), which is an IB layer three (L3) address. A GID can be created by concatenating a 64-bit subnet identifier (ID) with the 64-bit GUID to form an IPv6-like 128-bit address. For example, different port GUIDs can be assigned to the ports connected to the IB fabric.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

In accordance with an embodiment, an IB network can consist of one or more subnets interconnected using routers. Within a subnet, hosts are connected using switches and point-to-point links. Within each IB subnet, there can be one master management entity, the subnet manager (SM)—residing on any designated subnet device—that configures, activates, and maintains the IB subnet.

Through the subnet management interface, the SM exchanges control packets, called subnet management packets (SMPs), with the subnet management agents (SMAs) that reside on every IB device. Using SMPs, the SM is able to discover the fabric, configure end nodes and switches, and receive notifications from SMAs. The SM can also perform periodic light sweeps of the subnet to detect any topology changes and reconfigure the network accordingly.

In accordance with an embodiment, Intra-subnet routing in an IB network can be based on linear forwarding tables (LFTs) stored in the switches. The LFTs are calculated by the SM according to the routing mechanism in use. In a subnet, all HCA ports on the end nodes and all switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

In accordance with an embodiment, partitioning is a security mechanism supported by IB to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switches and routers with the partition enforcement tables containing P_Key values associated with the LIDs.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

An example of IB partitions is shown in FIG. 1, which shows an illustration of a multi-tenant cluster environment, in accordance with an embodiment. In the example shown in FIG. 1, nodes A-E, 101-105, use the InfiniBand fabric, 100, to communicate, via the respective host channel adapters 111-115. The nodes A-E are arranged into partitions, namely partition 1, 110, partition 2, 120, and partition 3, 130. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both part of partition 2, 120.

In accordance with an embodiment, partitions can be provided as a security mechanism to enforce isolation of logical groups of systems sharing a network fabric. IB partitions can provide similar isolation features as Ethernet 802.1Q VLANs. Each HCA port on a node in the fabric can be a member of one or more partitions. Partition memberships can be managed by a centralized partition manager, which can be a part of the SM. The SM can configure partition membership information on each port as a table of 16-bit partition keys (P_Keys). The SM can also configure switches and routers with the partition enforcement tables containing P_Key values.

In accordance with an embodiment, for communication between nodes, Queue Pairs (QPs) and End-to-End contexts (EECs) can be assigned to a particular partition, except for the management Queue Pairs (QP0 and QP1). The P_Key information can then be added to every transport packet sent. When a packet arrives at an HCA port or a switch, its P_Key value can be validated against the table configured by the SM. If an invalid P Key value is found, the packet is discarded. In this way, communication is allowed only between ports sharing a partition.

In accordance with an embodiment, IB is a layered architecture in which each physical link can be divided into multiple virtual channels using the VLs. Each VL can have its own buffering, flow-control and congestion management resources. QoS can be provided through a set of differentiated traffic classes, the SLs. The SL represents the class of service a packet can receive in the network. Each SL is mapped to a VL on a link based on the configured SL to VL mapping table. IB supports up to 16 VLs. However, the last VL is reserved for the subnet management traffic and is generally not used by user applications.

Multi-Tenancy in IB Systems

From the networking perspective, multi-tenancy can provide high utilization of network resources and help maintain cost effective operation for the service providers. However, multi-tenant infrastructures also impose several important security issues, one of the most challenging being associated with providing performance isolation for tenants. Each tenant should be provided with predictable network performance, unaffected by the workload of other tenants in the system. Network isolation in IB systems can be provided through partitioning.

In accordance with an embodiment, partitions are logical groups of ports such that the members of a group can only communicate to other members of the same group. At host channel adapters (HCAs) and switches, packets can be filtered using the partition membership information to enforce isolation. Packets with invalid partitioning information can be dropped as soon as the packets reach an incoming port. Routing algorithms used in HPC systems, however, are generally unaware of such partitions in the network. Hence, traffic flows belonging to different partitions might share links inside the network fabric.

In multitenant IB systems, partitions can be used to create tenant clusters. Wth partition enforcement in place, a node cannot communicate with other nodes that belong to a different tenant cluster. In this way, the security of the system can be guaranteed even in the presence of compromised or malicious tenant nodes.

IB routing generally can be based on linear forwarding tables (LFTs) stored in the switches. The LFTs are calculated by the subnet manager (SM) without considering partitioning information. Hence, an intermediate network link might carry traffic belonging to different partitions. This sharing of intermediate links can lead to partition interference. As a result, tenants experience non-predictable network performance. Furthermore, the balancing features of the routing algorithm are also affected in a partitioned subnet. This is because even though the links crossing partition boundaries are not utilized for user traffic, these links are routed the same way as other functional links (and hence considered in the balancing). Degraded balancing may result in reduced effective bandwidth and sub-optimal network utilization.

IB generally provides Quality of Service (QoS) features that can be used to guarantee each partition a share of the available bandwidth, regardless of the nodes in the other partitions. The bandwidth guarantees are then provided by assigning each partition an available differentiated traffic class, called service level (SL). Each SL is then mapped to one of the available fifteen virtual lanes (VLs) on the link according to the SL to VL mapping table.

A problem can arise when assigning SLs to the partitions because the system can only utilize 15 VLs to create distinct partitions in the network, while an IB network in general can have a large number of partitions (e.g., each port can be a member of up to 32,768 partitions). Furthermore, it is common to support only nine VLs (including one reserved for subnet management) in existing IB hardware. Moreover, as SLs are a scarce resource, it may be desirable to leave as many of them as possible free for other purposes, e.g. to provide fault tolerance or service differentiation in the network.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 2:
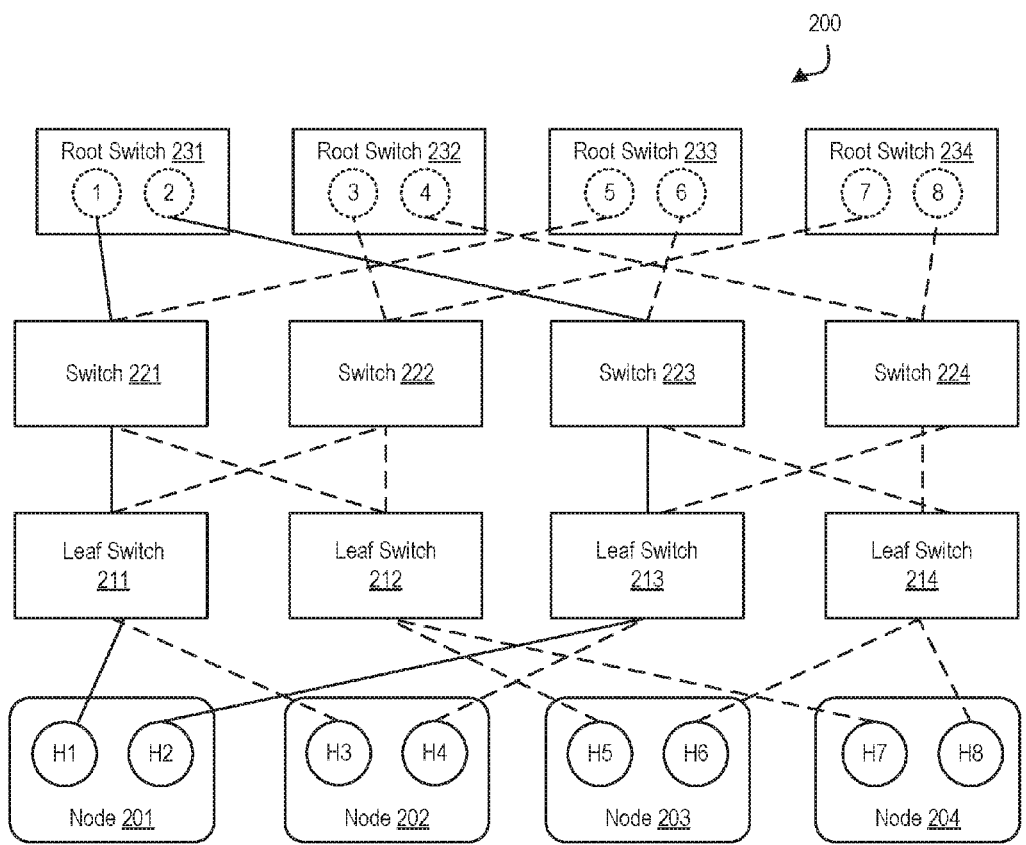
FIG. 2 shows an illustration of a tree topology in a network environment, in which an embodiment of the present disclosure can be practiced.

FIG. 2 shows an illustration of a tree topology in a network environment, in which an embodiment of the present disclosure can be practiced. As shown in FIG. 2, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 2, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select the least-used port each time a new route is added. If there are multiple ports connecting the same two switches, the ports form a port group. In that case, the least loaded port of the least loaded port group is selected to add a new route.

As mentioned above, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing is done oblivious to the partitions, fat-tree routed subnets, in general, provide poor isolation among partitions.

Figure 3:
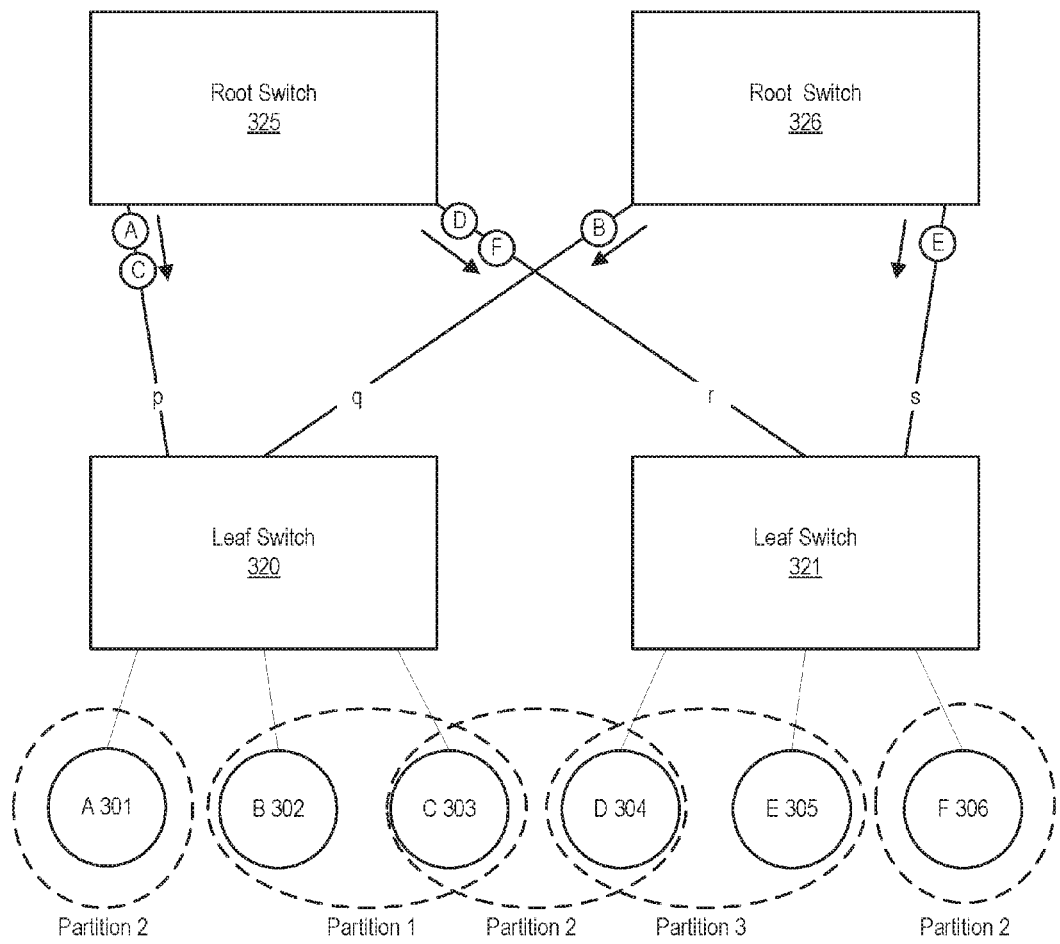
FIG. 3 shows an illustration of routing in a multi-tenant cluster environment, in which an embodiment of the present disclosure can be practiced.

FIG. 3 shows an illustration of routing in a multi-tenant cluster environment, in which an embodiment of the present disclosure can be practiced. More specifically, FIG. 3 elaborates on the issues of degraded load balancing and poor isolation.

FIG. 3 shows a 2-level fat-tree topology with four switches, root switches 325-326, and leaf switches 320-321, and six end nodes, nodes A-F, 301-306, in three overlapping partitions. Partition 1 comprises node B 302 and node C 303. Partition 2 comprises node A 301, node C 303, node D 304, and node F 306. Finally, partition 3 comprises node D 304 and node E 305.

In accordance with an embodiment, partitions 1 and 3 are entirely confined within the leaf switches 320 and 321 (i.e., single leaf switch partitions), respectively. Because of this, the communication between nodes in partitions 1 and 3 takes place through their corresponding leaf switches without moving traffic to the root switches, 325 or 326. When this topology is routed by the fat-tree routing mechanism, the routes towards the nodes connected to the leaf switches 320 and 321 are assigned root switches so the inter-leaf switch flows can reach their destination. For load-balancing, the routes towards A and C are assigned root switch 325 (shown as link p on the figure), while the root switch 326 routes traffic towards node B (shown as link q on the figure). Similarly for the leaf switch 321, traffic towards nodes D and F, in interleaf switch partition 2 are routed via the root switch 325 (shown as link r on the figure), and the traffic towards node E is routed via root switch 326 (shown as link s on the figure).

In accordance with an embodiment, an end port selection on the root switches is shown as the small circle with the node identifier in the figure. As the routing is done without considering the partitioning information (using the fat-tree routing mechanism), the paths in the subnet are not balanced properly. Links p and r are oversubscribed, while no intra-leaf switch flow will ever use link q or s. The routes assigned towards nodes B and E are not utilized (except for the relatively low management traffic) as both nodes cannot receive any communication from outside their leaf switches, due to their partitioning. This balancing issue also occurs in fat-trees when a partition's communication is restricted to only some of the levels in the topology.

Figure 4:
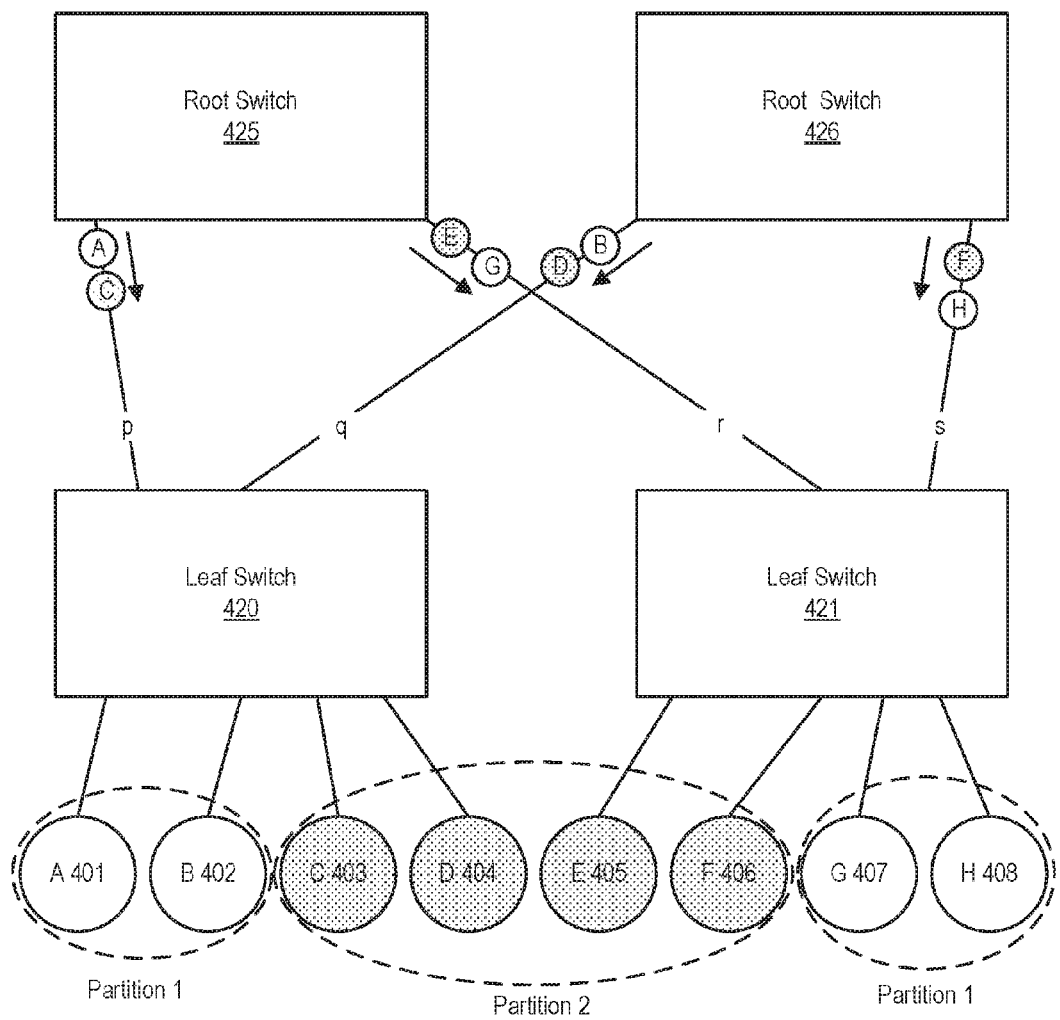
FIG. 4 shows an illustration of routing in a multi-tenant cluster environment, in which an embodiment of the present disclosure can be practiced.

Referring now to FIG. 4, which shows an illustration of routing in a multi-tenant cluster environment, in which an embodiment of the present disclosure can be practiced. More specifically, FIG. 4 elaborates on the issues associated with poor isolation within a fat-tree.

FIG. 4 shows a 2-level fat-tree topology with four switches, root switches 425-426, and leaf switches 420-421, and eight end nodes, nodes A-G, 401-408. As well, the end nodes are divided into two partitions. Partition 1 comprises node A 401, node B 402, node G 407, and node H 408. Partition 2 comprises node C 403, node D 404, node E 405, and node F 406.

Each of the partitions has two nodes connected to each of the two leaf switches. The fat-tree routing mechanism assigns downward ports on the root switches 425 and 426, as shown in the figure. Because of the nature of the fat-tree routing mechanism, each root switch routes traffic towards nodes belonging to both partitions, which provides for poor isolation, something that is not desired in a partitioned environment. For example, the traffic towards nodes A and C is routed on the shared link p. The sharing of intermediate links between nodes of different partitions can cause interference among them. Despite that the network has adequate resources at the root level to provide complete isolation among partitions, the fat-tree routing mechanism does not provide for the desired isolation.

Partition-Aware Fat-Tree (pFTree) Routing

In accordance with an embodiment, a partition-aware fat-tree routing mechanism (variously referred to herein as pFTree) can achieve desired objectives associated with multi-tenancy in an IB network. For example, the pFTree mechanism can provide well-balanced linear forwarding tables for fat-tree topologies by distributing routes evenly across the links in the tree. Additionally, while maintaining routes on the links balanced, pFTree can remove interference between paths belonging to different partitions.

In accordance with an embodiment, a pFTree mechanism can use partitioning information about the subnet to ensure that the nodes in a partition receive a predictable network performance that is unaffected by the workload running in other partitions. In a situation where the topology does not have enough links available to provide partition isolation at each level (without compromising on the load-balancing), the pFTree can assign VLs to reduce the impact of interference.

In accordance with an embodiment, the pFTree mechanism can work recursively to set up LFTs on all relevant switches for the LIDs associated with each end node. This is shown in the below pseudo code (referred to herein as listing 1):

```
1:   for each sw ∈ leafSwitches[ ] do
2:       Load partitioning information
3:       Filter leaf-switch only partitions
4:       Sort end nodes in partitioning specific order
5:       for each cn ∈ endNodes[ ] do
6:           Get lid of cn
```

-continued

```
 7:        Get partition key of the cn.hca_port
 8:        Set LFT[lid] ⇐ cn:hca_port on sw
 9:        ROUTEDOWNGOINGBYASCENDINGTD( ) on sw
10:    end for
11: end for
12: ASSIGNVIRTUALLANESTD( )
```

In accordance with an embodiment, the ROUTEDOWN-GOINGBYASCENDINGTD( ) is exemplified in the below pseudo code (referred to herein as listing 2):

```
 1: Get least-loaded ports from sw.UpGroups[ ] as uplist[ ]
 2: selected port ⇐ upList.get_port_max_guid( )
 3: for each port in upList[ ] do
 4:     r_sw ⇐ port:get_remote_switch( )
 5:     if r_sw is marked with partition_key then
 6:         selected_port ⇐ port
 7:         break
 8:     end if
 9: end for
10: if r_sw is not marked then
11:     Mark it with partition_key in DWN direction
12: end if
13: Set LFT[lid] ⇐ selected_port on r_sw
14: ROUTEUPGOINGBYDESCENDINGTD( ) on sw
15: ROUTEDOWNGOINGBYASCENDINGTD( ) on r_sw
```

In accordance with an embodiment, the ROUTEUPGO-INGBYDESCENDINGTD( ) is exemplified in the below pseudo code (referred to herein as listing 3):

```
 1: Get least-loaded ports from sw.DownGroups[ ] as dwnlist[ ]
 2: selected port ⇐ dwnList.get_port_max_guid( )
 3: for each port in dwnList[ ] do
 4:     r_sw ⇐ port:get_remote_switch( )
 5:     if r_sw is marked with partition_key then
 6:         selected_port ⇐ port
 7:         break
 8:     end if
 9: end for
10: if r_sw is not marked then
11:     Mark it with partition_key in UP direction
12: end if
13: Set LFT[lid] ⇐ selected_port on r_sw
14: ROUTEUPGOINGBYDESCENDINGTD( ) on r_sw
```

In accordance with an embodiment, the ASSIGNVIRTU-ALLANESTD( ) is exemplified in the below pseudo code (referred to herein variously as listing 4):

```
 1: vlanes_needed ⇐ 1
 2: max_vlanes ⇐ get_max_lanes( )
 3: strict ⇐ get_is_strict()
 4: for each partition in partition_tbl do
 5:     check if any intermediate communication link in this
         partition share a switch with a partition that has not
         been assigned a virtual lane
 6:     if require a separate vl then
 7:         if vlanes_needed = max_vlanes and strict = false then
 8:             vlanes_needed ⇐ 1
 9:         else
10:             error: routing failed
11:             return
12:         end if
13:         vlanes_needed++
14:         partition.vlane ⇐ vlanes_needed
15:     end if
16: end for
```

In accordance with an embodiment, after filtering out single-leaf switch partitions (i.e., those partitions that can communicate entirely within a single leaf switch), for each leaf switch, the mechanism can sort connected end nodes in a partitioning specific order (line 4 of above listing 1) (e.g., via each partitioning having a unique partitioning order number). This ordering can assist with ensuring that the nodes are routed according to their partitions, considering the available number of up-going ports at a leaf switch. The pFTree mechanism can then call a function, such as ROUTEDOWNGOINGBYASCENDINGTD (line 9 of above listing 1), and move up in the tree to select a port at the next level to route the LID, as shown in the listing 2.

In accordance with an embodiment, the port selection is based on a least number of already assigned routes. This can help ensure that the load is spread across the available paths. However, when several ports are available with the same load, the function can iterate through these least-loaded ports and select a port which is connected to a switch that is already marked with the partition key of the node being routed (lines 3-9 of listing 2). If no switch is marked (which can indicate that the first node for this partition is being routed), the system can default to the selection of the port with the highest globally unique identifier (GUID) (line 2 of listing 2). When a switch is selected the first time for a partition, it is marked in the downward direction with the partition key (line 11 of listing 2).

In accordance with an embodiment, after the down-going port is set for a LID at a switch, the mechanism can assign upward ports for it on all the connected downward switches by descending down the tree calling (ROUTEUPGOING-BYDESCENDINGTD of listing 3). Again, the selection of the up-going port can first be based on the load criterion and then on the partition marking of the remote switches, in the upward direction. The process can then be repeated by moving up to the next level in the tree until all LFTs are set. Note that a switch can be marked with multiple partition keys. The pFTree mechanism can maintain a table for each switch, storing the count of routed nodes for each partition. This counter can be used to decide the selection of the port if several switches with marked partitions are available to route a node. The switch with the maximum number of already routed nodes for a partition can be selected.

In accordance with an embodiment, once the routing tables are generated, keeping the partition isolation criteria, the mechanism can move on to check if some of the links are being used for flows towards nodes in different partitions. For those cases, the mechanism can assign VLs to the interfering partitions to provide isolation. An example of a VL assignment mechanism is shown in Listing 4.

In accordance with an embodiment, the VL assignment mechanism can iterate through the partitions and check if any intermediate communication link used by the nodes in the partition shares an intermediate link with another partition that has not been assigned a separate VL. If such a situation is encountered, a new VL can be assigned. The pFTree routing mechanism can support two modes for the VL selection: a strict mode and a normal mode.

In accordance with an embodiment, in the strict mode, if number of required VLs for pFTree routing exceeds the available VLs in the system, the routing can fail (line 10 of listing 4).

In accordance with an embodiment, in the normal mode, the algorithm can restart assigning VLs to the partitions from VL1 (line 8 of listing 4).

In accordance with an embodiment, an efficient partition-aware routing mechanism for IB based fat-tree networks (variously referred to as pFTree) is provided. The pFTree mechanism can provide network-wide isolation of partitions for fat-tree topologies. In addition, pFTree produces well balanced LFTs for the switches. Given adequate network resources, pFTree can isolate partitions solely at the physical link level. For instance, if a fat-tree has two non-overlapping equal sized partitions, pFTree can divide the intermediate network links into two equally sized logical sub-networks based on the routing itself. Furthermore, if the network does not have enough available resources to provide complete partition isolation, pFTree can employ a complementary VL based isolation scheme that works in conjunction with the physical isolation.

In accordance with an embodiment, the pFTree routing mechanism aims to achieve two main objectives. Firstly, the mechanism can generate well-balanced LFTs for fat-tree topologies by distributing routes evenly across the links in the tree. Secondly, while maintaining routes on the links balanced, pFTree removes interference between paths belonging to different partitions. The pFTree can use partitioning information about the subnet and ensures that the nodes in a partition receive a predictable network performance, unaffected by the workload running in other partitions. If the topology does not have enough links available to provide partition isolation at each level (without compromising on the load-balancing), the pFTree can use VLs to reduce the impact of interference.

In accordance with an embodiment, the pFTree mechanism can work recursively to set up LFTs on all relevant switches for the LIDs associated with each end node. After filtering out single leaf switch partitions, for each leaf switch, the mechanism can sort connected end nodes in a partitioning specific order. This ordering ensures that the nodes are routed according to their partitions, considering the available number of up-going ports at a leaf switch. The port selection at each level can be based on the least number of already assigned routes to make sure that the load is spread across the available paths. However, when several ports are available with the same load, the function iterates through these least-loaded ports and selects a port which is connected to a switch that is already marked with the partition key of the node being routed. If no switch is marked (i.e., routing for the first node for a particular partition), pFTree can fall to the default selection of the port with the highest globally unique identifier (GUID). When a switch is selected the first time for a partition, the switch can be marked with the partition key. In this way the mechanism can help ensure that, given enough paths are available for balancing, the nodes belonging to one partition will be routed through the same switches and corresponding links. Once the routing tables are generated, keeping the partition isolation criteria, the mechanism can move on to check if some of the links are being used for flows towards nodes in different partitions. For those cases, the mechanism can assign VLs to the interfering partitions to provide isolation.

Referring now to FIGS. 5-8, which are illustrations of supporting partition-aware routing in a multi-tenant cluster environment, in accordance with an embodiment.

In accordance with an embodiment, the port selection mechanism in the pFTree routing is shown in FIGS. 5-8 by way of a simple section of an oversubscribed fat-tree network.

Figure 5:
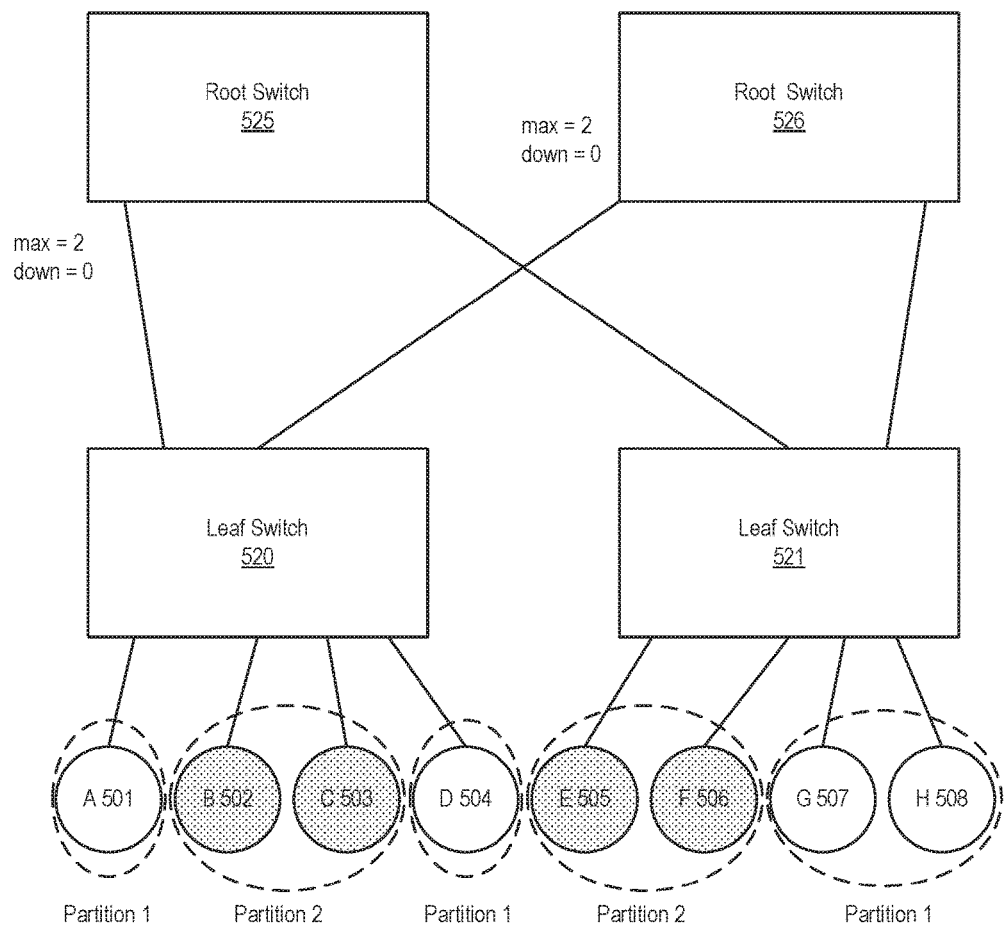
FIG. 5 shows an illustration of supporting partition-aware routing in a multi-tenant cluster environment, in accordance with an embodiment.

Referring now to FIG. 5, which shows a 2-level fat-tree topology with four switches, root switches 525-526, and leaf switches 520-521, and eight end nodes, nodes A-G, 501-508. As well, the end nodes are divided into two partitions. Partition 1 comprises node A 501, node D 504, node G 507, and node H 508. Partition 2 comprises node B 502, node C 503, node E 505, and node F 506.

In accordance with an embodiment, as shown in FIG. 5, the example section consists of two leaf switches (520 and 521), each connected to four end nodes and two switches at the next level above the leaf switches, i.e., root switches (525 and 526). The variables for down and max, which represent a number of assigned routes in the downward direction, and maximum number of nodes that can be routed to ensure proper balancing on each link, respectively, are also indicated in the figure.

In accordance with an embodiment, given there are two up-going ports at each leaf switch with four end nodes to route, each of the up-links should route two end-nodes down to ensure that the links are balanced (i.e., max=2).

Figure 6:
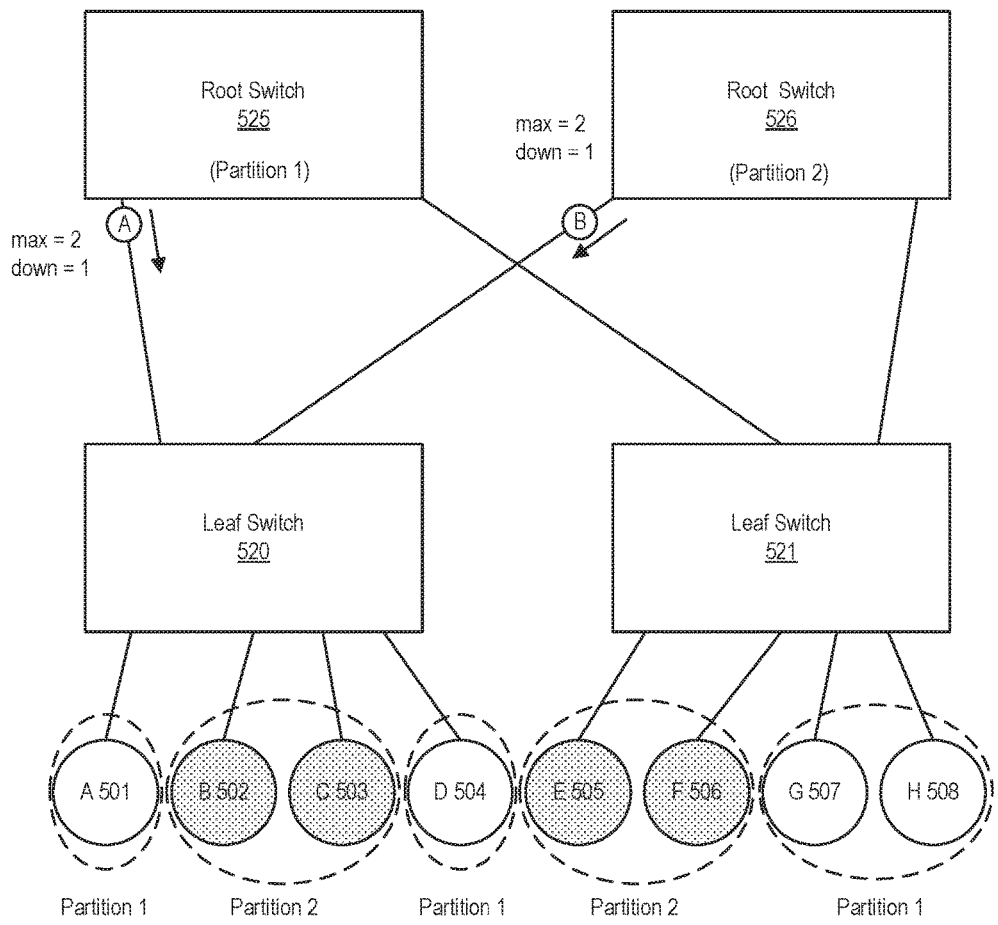
FIG. 6 shows an illustration of supporting partition-aware routing in a multi-tenant cluster environment, in accordance with an embodiment.

In accordance with an embodiment, for leaf switch 520, the routing of the first two nodes, node A and node B, is shown in FIG. 6. The routing mechanism can select root switch 525 to route traffic towards node A and mark the switch with node A's partition key, shown as "(Partition 1)" in the figure. Similarly, for node B, root switch 526 can be selected and marked with node B's partition key, shown as "(Partition 2)" in the figure. The variable down is also updated to count a single routed node on each of the two downward links.

Figure 7:
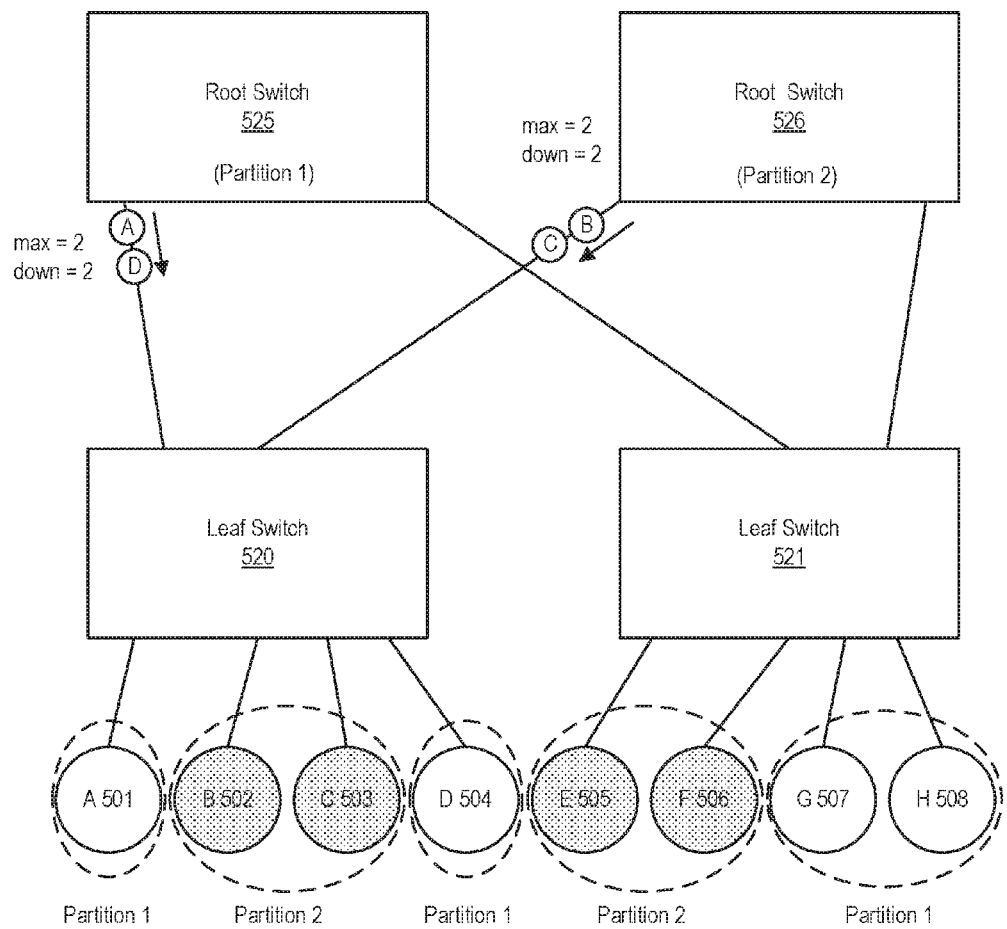
FIG. 7 shows an illustration of supporting partition-aware routing in a multi-tenant cluster environment, in accordance with an embodiment.

In accordance with an embodiment, for nodes C and D, the switch, which is already marked with the corresponding partition key, can be selected, as given in FIG. 7. The resultant routes flow towards nodes belonging to the first partition, i.e., nodes A and D, with the same link through root switch 525. Similarly, the nodes of the second partition, i.e., nodes B and C can be routed downwards through root switch 526. This separation of routes avoid interference between the traffic flows of the two partitions. Note that the number of nodes routed downwards on each links does not exceed the max variable, which means that the routing is still balanced.

Figure 8:
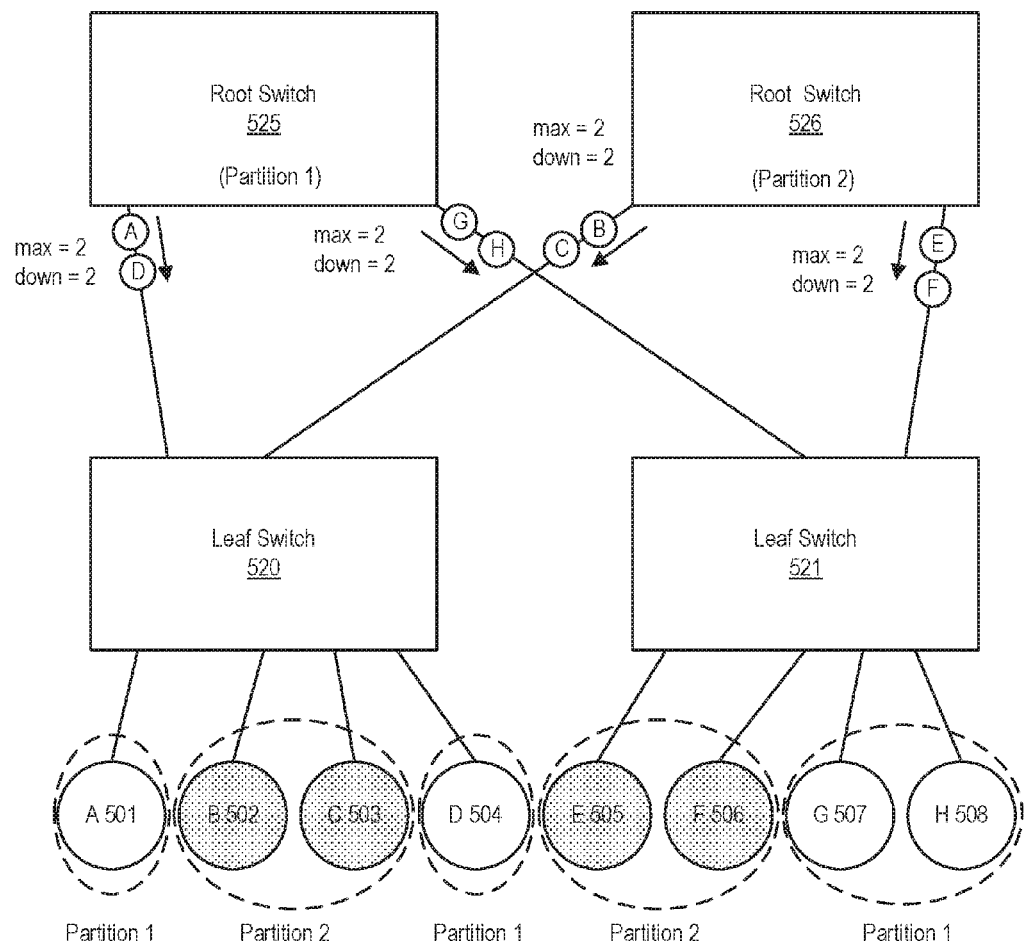
FIG. 8 shows an illustration of supporting partition-aware routing in a multi-tenant cluster environment, in accordance with an embodiment.

Finally, in accordance with an embodiment, FIG. 8 shows routing for the end nodes connected to the leaf switch 521. Here also, as the second-level switches are already marked with the partition keys from the first leaf switch routing, the corresponding switches can be selected to route each of the nodes, i.e., nodes E, F, G, and H. As shown in the figure, the final routing can isolate the two partitions by dividing the intermediate network links into two equal sized logical sub-networks based on the routing.

Extended pFTree

In accordance with an embodiment, when a network does not have enough resources to isolate partitions solely at the physical link level, the pFTree routing algorithm uses VLs to reduce inter-partition interference. However, different partitions may have different isolation needs depending on the corresponding SLAs (service level agreements) or QoS requirements. For example, some of the partitions in a network may be running critical operations, and may require complete physical isolation in all cases. Similarly, in many networks, depending on the availability of the VLs, some partitions may have to share a VL with another partition, which may not be desirable for communication-intensive workloads. The pFTree algorithm described above is unable to specify the aforementioned partition-wise requirements in the routing, and all partitions are treated with equal priority assuming similar QoS requirements.

Figure 9:
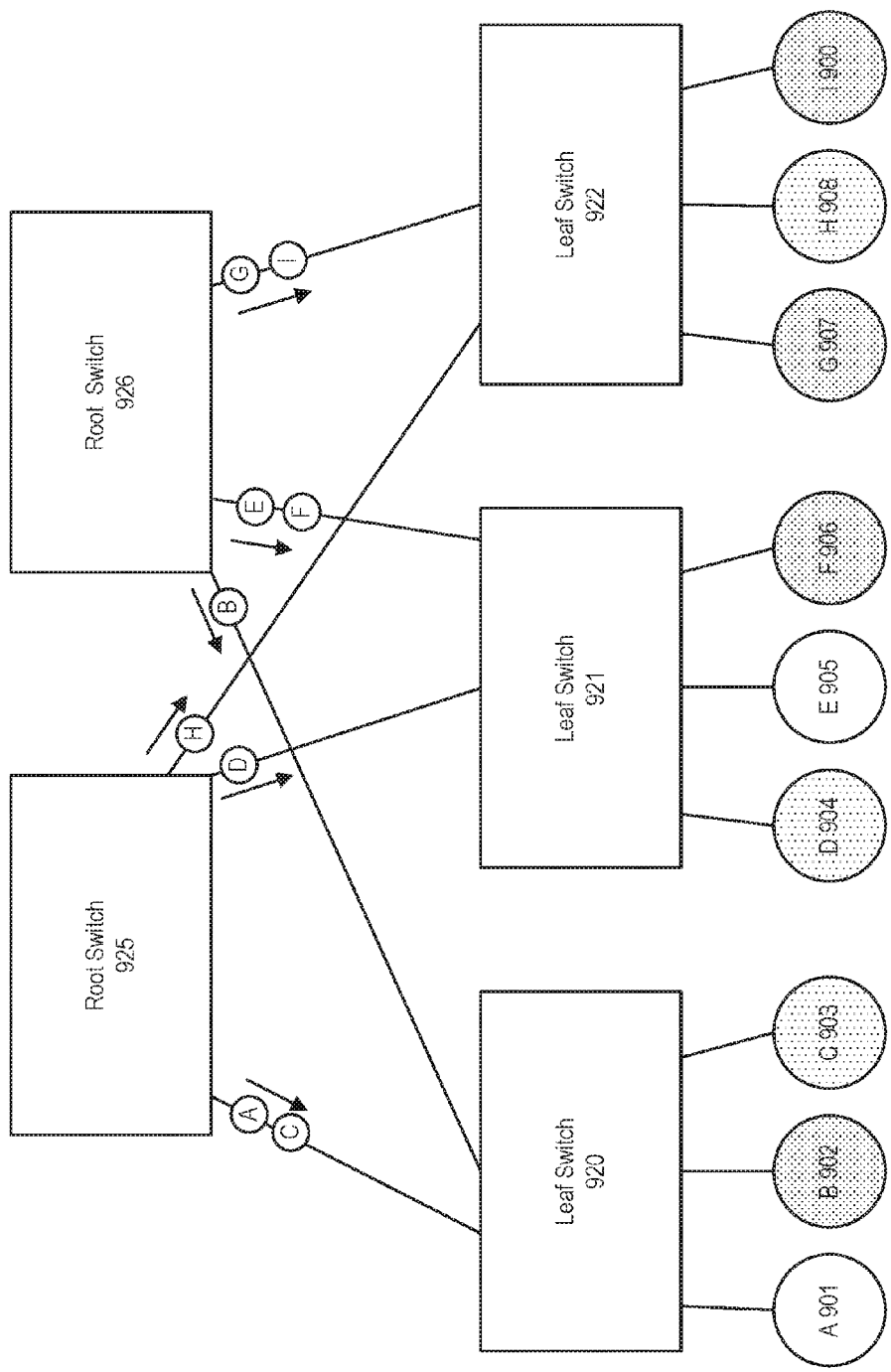
FIG. 9 shows an illustration of supporting network isolation in a multi-tenant cluster environment, in accordance with an embodiment.

Referring now to FIG. 9 which is an illustration of supporting network isolation in a multi-tenant cluster environment, in accordance with an embodiment. More specifically, FIG. 9 represents an example of a fat-tree network with nine nodes (i.e., nodes A-I, 901-909) in three different tenant partitions (shown by the varied shading). Nodes A 901 and E 905 belong to partition 1, nodes B 902, F 906, G 907, and I 909 belong to partition 2, and nodes C 903, D 904, and H 908 belong to partition 3. The fat tree network additionally contains root switches 925 and 926, as well as leaf switches 920, 921, and 922.

In accordance with an embodiment, partition 1 can have very high QoS requirements, and that it is critically important that the workload running in this partition is not affected by any inter-partition interference. However, as the given fat-tree network has only two root switches, root switch 925 and root switch 926, while having three different tenant partitions, it is not possible to isolate these partitions solely at the physical level. As described above, in such cases the pFTree routing algorithm can proceed with isolating partitions using VLs. Also shown in the figure is the routing obtained using the default pFTree algorithm (above), using small node circles just below the switches to denote flows towards the destination nodes. It can be seen that the traffic towards node A of partition 1 currently shares the link between root switch 925 and leaf switch 920 with traffic towards node C, which belongs to a different partition (i.e., partition 3). Similarly, traffic towards E of partition 1 (the partition requiring high QoS) shares a link with traffic towards node F of partition 2. On both of these links, in order to preserve isolation, the routing mechanism can utilize separate virtual lanes. However, even though the use of a VL decreases interference, it does not eliminate such interference completely.

Isolation Policies

In accordance with an embodiment, the pFTree routing mechanism can be extended to include partition-wise and global isolation policies. For each partition, the isolation policies can determine how the nodes in a partition are allowed to share network resources with nodes belonging to other partitions. The global policies can determine whether the routing will fail, or continue with best-effort isolation if all partition-wise isolation policies cannot be satisfied for a given network.

In accordance with an embodiment, various policy parameters for the extended pFTree routing mechanism can be provided. Each partition can be marked with one of the three partition-wise policy parameters. Marking a partition with a phy-isolation (also referred to herein as a strict parameter) can guarantee that the routing algorithm reserves network resources specifically for the partition, and no nodes in the partition will share any link with any other node in a different partition. Marking a partition with a parameter vlane-isolation (also referred to herein as a strict virtual lane parameter) allows the marked partition to share network resources with other partitions using a separate VL only. Marking a partition with a def-isolation (also referred to herein as a best effort parameter) scheme implements best-effort isolation for the marked partition.

In accordance with an embodiment, the policy parameters can also include global policy parameters. Global policy parameters, strict and best-effort, can define whether the routing mechanism fails or falls back to the best-efforts routing when partition-wise policy parameters cannot be satisfied in a given subnet. For example, when a network does not have enough links or VLs for providing the desired isolation. The policy parameters can be provided to the routing mechanism using a partition configuration file.

Extended pFTree Mechanism

In accordance with an embodiment, an extended pFTree routing mechanism (also referred to herein variously as "pFTree-Ext") works in a similar fashion as the original pFTree (described above), by recursively traversing the fabric to set up LFTs in all switches for the LIDs associated with each end node. However, unlike pFTree, pFTree-Ext can also consider the defined global and partition-wise isolation policies when assigning routes.

In accordance with an embodiment, pseudo code of the pFTree-Ext (also referred to herein variously as listing 5) routing mechanism is shown below:

---

Ensure: The LFTs are generated for the switches conforming isolation policies
1:  global_param ⇐ get_global_isolation_policy( )
2:  partitions_info ⇐ get_partition_information( )
3:  ORDERCOMPUTENODES( )
4:  for each sw ∈ leafSwitches[ ] do
5:    for each cn ∈ computeNodes[ ] do
6:      Get lid of cn
7:      Get partition_key of the cn.hca_port
8:      Set LFT[lid] ⇐ cn:hca_port on sw
9:      ROUTEDOWNGOINGBYASCENDINg( ) on sw
10:    end for
11:  end for
12:  ASSIGNVIRTUALLANES( )
13:  VALIDATEPOLICIES( )

---

In accordance with an embodiment, the mechanism is deterministic and the routes are calculated backwards, starting at the destination nodes. The mechanism can first sort compute nodes in a partition specific order (line 3 of listing 5). The partition specific order can ensure faster execution of the mechanism, as once the nodes are ordered, they can be routed iteratively without maintaining maximum counters on each down-going and up-going port. As shown in the pseudo code for ORDERCOMPMUTENODES, below, for each leaf switch, ORDERCOMPUTENODES first sorts end nodes in the increasing order of their partition policy priority (line 4 of listing 6 (see below)). The nodes belonging to the partitions marked with phy-isolation parameter can be added first, while partitions with vlane-isolation can be added second. Finally, the partition nodes with policy parameter value of def-isolation are added to the list of compute nodes. The mechanism then uses partitioning information of the nodes to generate a routing order where nodes belonging to one partition tends to get indices suggesting same up-going links in the network on iterative routing. This is done by adding the number of available up-going ports to the index chosen to route the first node belonging to a partition, using a partition key table (lines 14-28 of listing 6). However, when such an index is already taken or the index is beyond the compute array bounds, the first free index can be chosen and marked with the partition key for later selections (line 24 of listing 6). Pseudo code for ORDERCOMPUTENODES (also referred to herein variously as listing 6) is shown here:

---

Require: List of switches and attached compute nodes
Ensure: The compute nodes are ordered for the pFTree-Ext routing algorithm
1:  for each sw in leafswitches[ ] do
2:    num_up_ports ⇐ count(sw → upPorts[ ])
3:    num_cns ⇐ count(sw → computeNodes[ ])
4:    Sort nodes in increasing order of partition isolation policy (phy > vlane > def)
5:    if num_cns ≥ num_up_ports then
6:      return
7:    end if
8:    index arr[ ] = array(num_cns)
9:    taken[ ] = array(num_cns)
10:   pkey_tbl[ ] = map( )
11:   id ⇐ 0
12:   for each cn in sw → computeNodes[ ] do
13:     pkey ⇐ cn → get_partition_key( )

```
14:            if pkey not found in pkey_tbl then
15:               if taken[id] ≠ false then
16:                  id ⇐ get_free_id( )
17:               end if
18:               index_arr[cn[i]] ⇐ id
19:               taken[id] = true
20:               insert pkey in pkey_tbl
21:            else {pkey is already in pkey_tbl}
22:               id ⇐ id(pkey) + num_up_ports
23:               if id ≥ num_cns or taken[id] = true then
24:                  id ⇐ get_free_id( )
25:               end if
26:               index_arr[cn[i]] ⇐ id
27:               taken[id] = true
28:               update pkey_tbl
29:            end if
30:         end for
31:         Sort sw → computeNodes[ ] with respect to index_arr[ ]
32:      end for
```

In accordance with an embodiment, once the nodes are properly ordered, the pFTree-Ext mechanism can call ROUTEDOWNGOINGBYASCENDING (line 9 of listing 5) and moves up in the tree to select a port at the next level to route the LID in the downward direction, as exemplified in the below pseudo code for ROUTEDOWNGOINGBYASCENDING (also referred to herein variously as listing 7):

```
Require: A switch sw, an end node lid and partition_key
 1:   Sort sw.upPorts[ ] with increasing load and then GUID
 2:   Get least loaded ports as leastLoadedList[ ]
 3:   partition_param ⇐ get isolation_policy(partition_key)
 4:   selected_port ⇐ null
 5:   for each port in leastLoadedList[ ] do
 6:      r_sw ⇐ port.get_remote_switch( )
 7:      if r_sw is marked with partition_key then
 8:         selected_port ⇐ port
 9:         break
10:      end if
11:   end for
12:   if selected_port = null then
13:      while selected_port = null do
14:         port ⇐ sw.upPorts[ ].get_next( )
15:         r_sw ⇐ port.get_remote_switch( )
16:         if r_sw is marked with a partition with isolation policy >
                  partition_param then
17:            continue
18:         end if
19:         selected_port ⇐ port
20:      end while
21:   end if
22:   Set LFT[lid] ⇐ selected_port on r_sw
23:   if r_sw is not marked then
24:      Mark it with partition_key in DWN direction
25:   end if
26:   ROUTEUPGOINGBYDESCENDING( ) on sw
27:   ROUTEDOWNGOINGBYASCENDING( ) on r_sw
```

In accordance with an embodiment, the port selection is first based on the least-loaded port list obtained from the sorted available up-going ports (line 1-2 of listing 7). The function iterates through these least-loaded ports and selects a port which is connected to a switch that is already marked with the partition key of the node being routed (lines 5-11 of listing 7). If no switch is found marked, the algorithm iterates through the up-going ports to find a suitable route for the LID. The up-going port list is sorted in the increasing order of the current load on the ports. For the ports with same load, sorting is done in decreasing order of their globally unique identifiers (GUIDs) in order to remain deterministic. Furthermore, the function does not select a port which is already marked with a partition key with a higher isolation policy parameter than the routed node (line 16-17 of listing 7). Finally, when a port is selected, the corresponding switch is marked in the downward direction with the partition key (line 24 of listing 7).

In accordance with an embodiment, once a down-going port is set for a LID at a switch, the pFTree-Ext mechanism assigns upward ports for it on all the connected downward switches by descending down the tree calling ROUTEUPGOINGBYDESCENDING (also referred to herein variously as listing 8). Pseudo code for ROUTEUPGOINGBYDESCENDING is shown here:

```
Require: A switch sw, an end node lid and partition_key
 1:   Get least-loaded ports from sw.dwnPorts[ ] as dwnlist[ ]
 2:   selected_port ⇐ dwnList.get port_max_guid( )
 3:   for each port in dwnList[ ] do
 4:      r_sw ⇐ port.get_remote_switch( )
 5:      if r_sw is marked with partition_key then
 6:         selected_port ⇐ port
 7:         break
 8:      end if
 9:   end for
10:   if r_sw is not marked then
11:      Mark it with partition_key in UP direction
12:   end if
13:   Set LFT[lid] ⇐ selected_port on r_sw
14:   ROUTEUPGOINGBYDESCENDING( ) on r_sw
```

In accordance with an embodiment, the selection of the up-going port is first based on the load criterion and then on the partition marking of the remote switches, in the upward direction this time. The process is then repeated by moving up to the next level in the tree until all LFTs are set. Note that a switch can be marked with multiple partition keys. The pFTree-Ext mechanism maintains a table for each switch, storing the count of routed nodes for each partition. This counter is used to decide the selection of the port if several switches with marked partitions are available to route a node. The switch with the maximum number of already routed nodes for a partition is selected.

In accordance with an embodiment, once the routing tables are generated, keeping the partition isolation criteria, the pFTree-Ext mechanism moves on to check if some of the links are being used for flows towards nodes in different partitions. For those cases, the pFTree-Ext mechanism can assign VLs to the interfering partitions to provide isolation. Pseudo code for VL assignment function, ASSIGN VIRTUALLANES, is shown below in (herein referred to variously as listing 9):

```
Require: The pFTree-Ext routing tables have been generated
Require: Switches have been marked with the partition keys
Require: Global policy parameter, strict or best-effort
Ensure: A partitions marked with vl-isolation has a separate VL
Ensure: No two partitions with the same SL share a link
 1:   vlanes_needed ⇐ 1
 2:   max_vlanes ⇐ get_max_lanes( )
 3:   strict ⇐ get_is_strict( )
 4:   for each partition in partition_tbl do
 5:      check if the isolation policy of the partition is vl-isolation and
            any intermediate communication link in this partition share a
            switch with a partition that has not been assigned a virtual lane
 6:      if require a separate vl then
 7:         if vlanes_needed = max_vlanes and global_param = strict
               then
 8:            vlanes_needed ⇐ 1
 9:         else
10:            error: routing failed
11:            return
12:         end if
```

```
13:            vlanes_needed++
14:            partition.vlane ⇐ vlanes_needed
15:        end if
16: end for
```

In accordance with an embodiment, the virtual lane assignment function can iterate through all partitions and check if the partition is marked with the vl-isolation policy parameter, and if any intermediate communication links used by the nodes in the partition shares an intermediate link with another partition that has not been assigned a separate VL. If so, a new VL is assigned. The VL assignment function can also use global policy parameters with two modes: strict and best-effort. In the strict mode, if the number of required VLs for pFTree-Ext routing mechanism exceeds the number of available VLs in the system, the routing fails (line 10 of listing 9). In best-effort mode, the virtual lane assignment function can restart assigning VLs to the partitions from $VL_1$ (line 8 of listing 9).

In accordance with an embodiment, the pFTree-Ext routing mechanism can easily be modified to consider a particular group of VLs, rather than all available VLs. Similarly, to make it less likely for partitions with higher isolation policies to share VLs, once all available VLs are used, the VL list can be ordered by decreasing priority of assigned partitions for selection (instead of selecting $VL_1$). After the VLs are assigned, the pFTree-Ext routing algorithm validates whether all the partition-wise and global policies are met (line 13 of listing 5).

In accordance with an embodiment, the pFTree-Ext mechanism can incorporate isolation policies into a routing algorithm. Unlike pFTree, which for each leaf switch sorts end nodes in the partition-specific order before routing, the pFTree-Ext routing mechanism first sorts end nodes in the order of their partition priorities. The end nodes in the partitions marked with phy-isolation get the maximum priority. After that, the mechanism proceeds by sorting end nodes in partition specific order as earlier. The additional sorting is done upfront to ensure that the nodes with the highest partition priorities are routed first.

In accordance with an embodiment, the pFTree-Ext mechanism can further incorporate isolation policies into a routing algorithm by changing the way a port is selected for routing a new node. For example, to select a down-going port among several candidate ports, the pFTree-Ext, besides checking the current load on the port, removes any port-group where the corresponding switch has already been marked with the key of a partition with a higher priority than the partition of the node currently being routed.

In accordance with an embodiment, and additionally, if the available network resources do not allow the partition-wise policy parameters to be satisfied, the pFTree-Ext routing mechanism can either fail or proceeds according to the global policy parameters. The original pFTree routing algorithm only considers the available VLs in that case.

Figure 10:
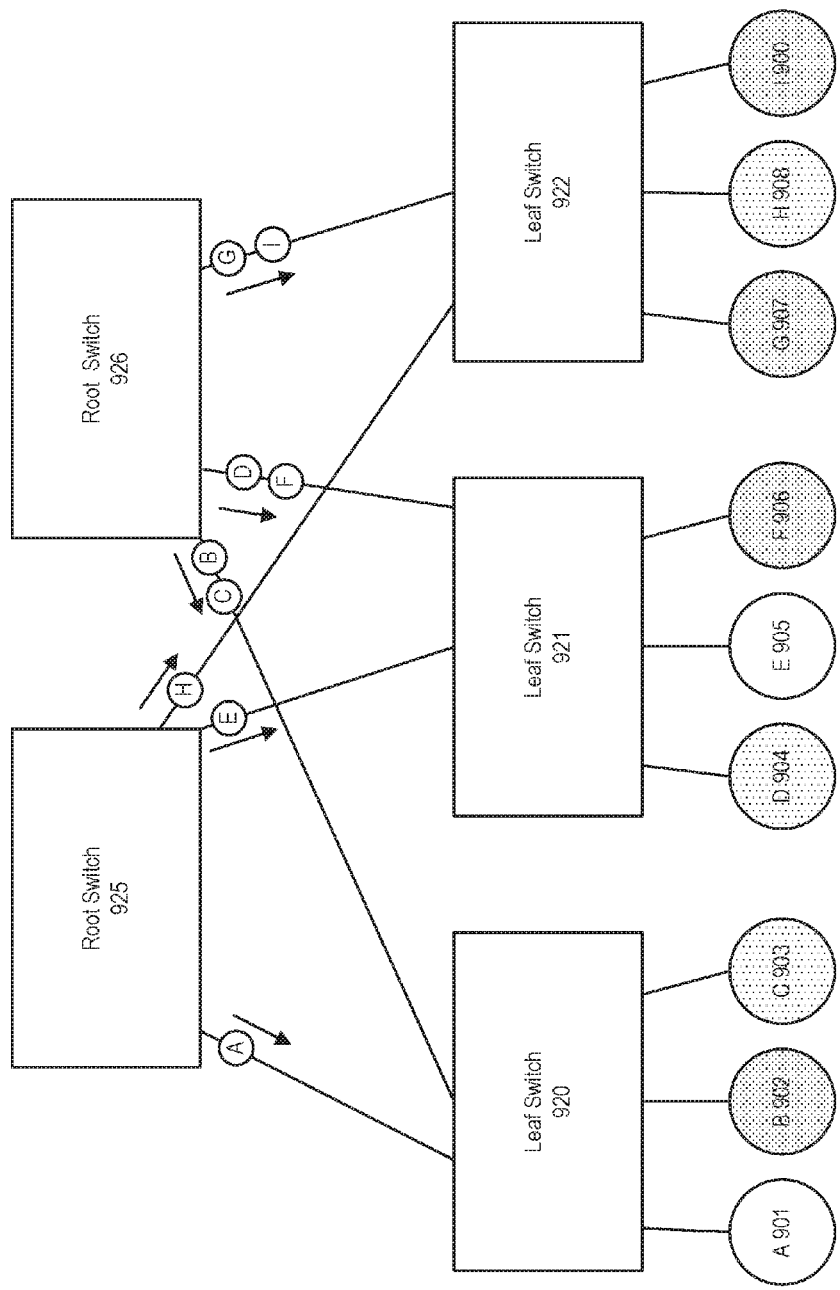
FIG. 10 shows an illustration of supporting network isolation in a multi-tenant cluster environment, in accordance with an embodiment.

Referring now to FIG. 10, which is an illustration of supporting network isolation in a multi-tenant cluster environment, in accordance with an embodiment. More specifically, FIG. 10 represents an example of a fat-tree network with nine nodes (i.e., nodes A-I, 901-909) in three different tenant partitions (shown by the varied shading). Nodes A 901 and E 905 belong to partition 1, nodes B 902, F 906, G 907, and I 909 belong to partition 2, and nodes C 903, D 904, and H 908 belong to partition 3. The fat tree network additionally contains root switches 925 and 926, as well as leaf switches 920, 921, and 922.

In accordance with an embodiment, FIG. 10 represents a subnet routing using a pFTree-Ext mechanism where partition 1 (i.e., node A 901 and node E 905) has been marked with high priority, such as a phy-isolation, which can guarantee that the routing mechanism reserves network resources specifically for the partition, and no nodes in the partition will share any link with any other node in a different partition. The resultant routing is shown in FIG. 10. Because partition 1 has been marked with a high priority, such as phy-isolation, neither node of partition 1 (i.e., nodes A and E) share links with any other partition. However, as no such policy was applied to partition 2 and/or partition 3, these partitions share all down-going links from switch 926.

Weighted pFTree Routing Mechanism

In accordance with an embodiment, a second extension of the pFTree routing mechanism can account for weight of traffic characteristics in a subnet. This can be referred to as weighted pFTree routing mechanism (pFTree-Wt). The pFTree-Wt is based on the notion of weights associated with each compute node. These weights are used to take known or learned traffic characteristics into account when calculating routes. Irrespective of the partitioning, the weight of a node reflects the degree of priority the flows towards a node receive when calculating routing tables. For example, a possible configuration could be to assign weights to the nodes in the range [1, 100] depending on how much traffic a node is known to receive in the network. Such a scheme could assign weight=1 for the nodes that receive very little traffic (primarily traffic generators, for example), and weight=100 for the nodes receiving traffic near the link capacity. The values in between, 1<x<100, can then reflect the proportion of traffic a node is expected to receive in the network.

In accordance with an embodiment, when no administrative information about the compute nodes is available, weights can be calculated using a port data counter based scheme. For example, in OFED (OpenFabrics Enterprise Distribution), a utility called ibdatacounts is provided for reading data counters. After setting up the network with equal initial weights for all nodes, new weights can be learned after a specified time period.

In accordance with an embodiment, if B represents the set of receive bandwidths for all the nodes measured over a time period, the weight for each node can be assigned in the range [a, b] by using linear transformation as below:

$$W(x) = (x-a)\frac{b-a}{\max(B)-\min(B)} + a, \forall x \in B$$

In accordance with an embodiment, using the pFTree-Wt routing mechanism, each compute node can be assigned a parameter, weight. Unlike the original pFTree routing, where the load on a port represents the number of assigned routes towards nodes in the up and down directions, the load on a port in the pFTree-Wt routing scheme is the accumulated weight of the compute nodes routed from that port in each direction. For each leaf switch, the nodes in one partition are also sorted by their weights before routing. When a downward port at a switch is selected to route a compute node, pFTree-Wt updates the current load on the selected port by adding the weight of the corresponding compute node. Similarly, for the upward links, an upward load is maintained on each port. The port selection criteria is similar to the pFTree routing, and considers the partitions of the node as well. However, unlike port counters, the port selection at each level in pFTree-Wt is based on the least accumulated weight on all the available ports. When several ports are available with the same load, the mechanism iterates over these least-loaded ports and selects a port which is connected to a switch that is already marked with the partition key of the node being routed. Once the routing tables are generated, the pFTree-Wt can run VL assignment to ensure that different VLs are assigned to nodes associated with different partitions sharing links in the network.

Figure 11:
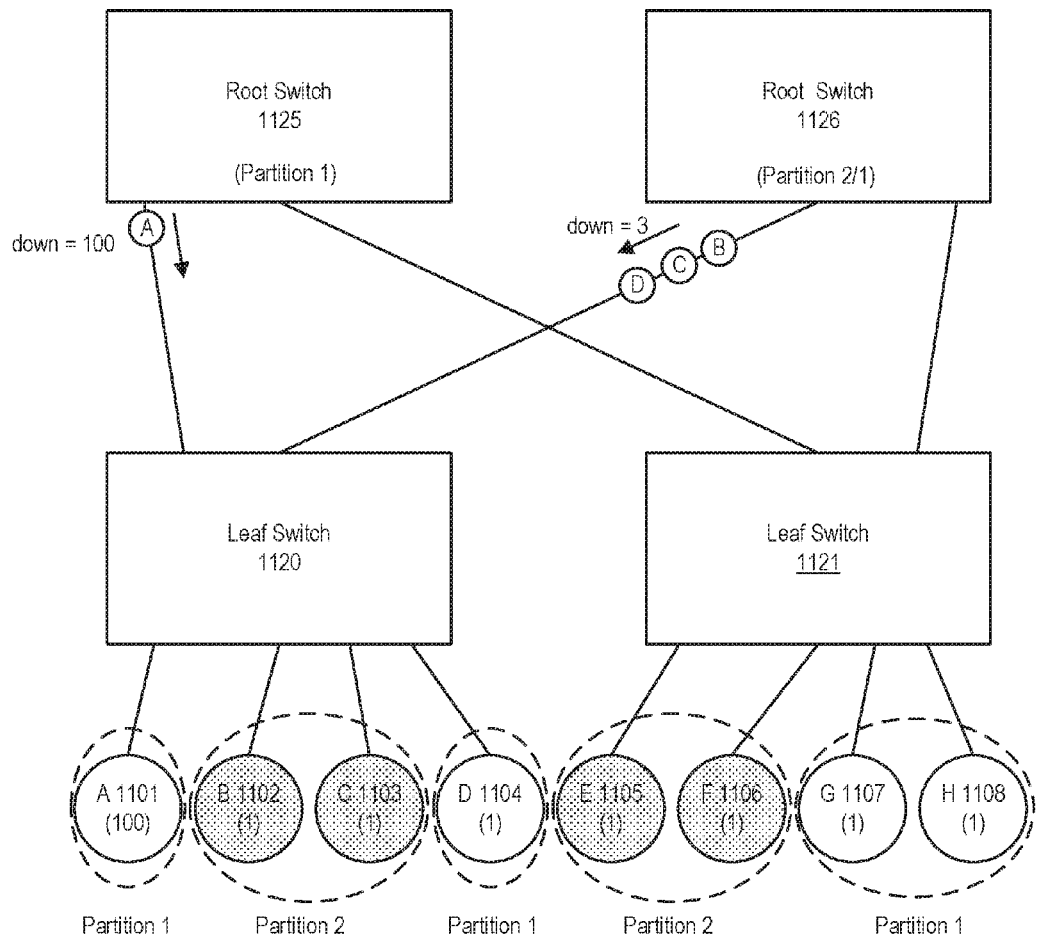
FIG. 11 shows an illustration of supporting weighted partition-aware routing in a multi-tenant cluster environment, in accordance with an embodiment.

FIG. 11 shows an illustration of supporting weighted partition-aware routing in a multi-tenant cluster environment, in accordance with an embodiment. Specifically, FIG. 11 shows a 2-level fat-tree topology with four switches, root switches 1125-1126, and leaf switches 1120-1121, and eight end nodes, nodes A-G, 1101-1108. As well, the end nodes are divided into two partitions. Partition 1 comprises node A 1101, node D 1104, node G 1107, and node H 1108. Partition 2 comprises node B 1102, node C 1103, node E 1105, and node F 1106.

In accordance with an embodiment, each node in FIG. 11 has been assigned a weight. Node A 1101 has been assigned a weight of 100, while the remaining nodes have been assigned a weight of 1. The downward routing using pFTree-Wt to leaf switch 1120 is shown in FIG. 11. When routing nodes connected to the leaf-switch 1120, two up-going ports are available connected to the switches 1125 and 1126, respectively. As the node A has a weight equal to 100, it is assigned one of those links, switch 1125→ switch 1120, while the other three nodes share the other link, switch 1126→ switch 1120. This is because the sum of the weights of the other three nodes is only 3, which is lower than 100. Even though the selected switches are marked with the partition keys, still the partitions cannot be isolated in the subnet due to the weighted partition-aware routing.

Figure 12:
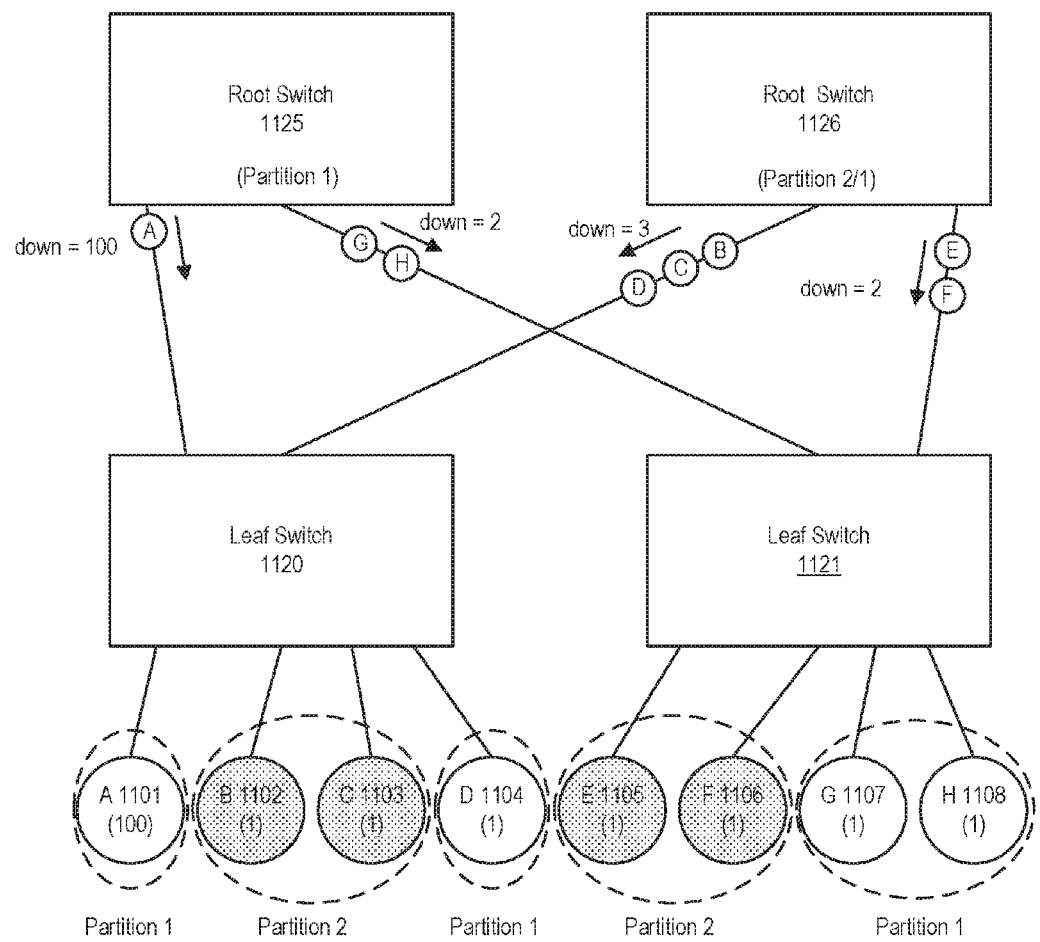
FIG. 12 shows an illustration of supporting weighted partition-aware routing in a multi-tenant cluster environment, in accordance with an embodiment.

FIG. 12 shows an illustration of supporting weighted partition-aware routing in a multi-tenant cluster environment, in accordance with an embodiment. Specifically, FIG. 12 shows a 2-level fat-tree topology with four switches, root switches 1125-1126, and leaf switches 1120-1121, and eight end nodes, nodes A-G, 1101-1108. As well, the end nodes are divided into two partitions. Partition 1 comprises node A 1101, node D 1104, node G 1107, and node H 1108. Partition 2 comprises node B 1102, node C 1103, node E 1105, and node F 1106.

In accordance with an embodiment, each node in FIG. 12 has been assigned a weight. Node A 1101 has been assigned a weight of 100, while the remaining nodes have been assigned a weight of 1. The downward routing using pFTree-Wt to leaf switch 1121 is shown in FIG. 12. Unlike the routing to leaf switch 1120, each node connected to leaf switch 1121 has an identical weight (i.e., 1). Because of this, the partitions can remain isolated on the links. Nodes G and H, belonging to the same partition, can be routed through the link between switch 1125→ switch 1121 in the downward direction. Nodes E and F, of partition 2 and having an equal weight, can be routed through the link between switch 1126→ switch 1121 in the downward direction.

In accordance with an embodiment, pFTree-Wt satisfies the weighted load balancing on the links, while keeping the partitions as isolated as possible. Note that the final routing, as shown in FIG. 12, has only one link shared by the nodes of the two partitions.

Figure 13:
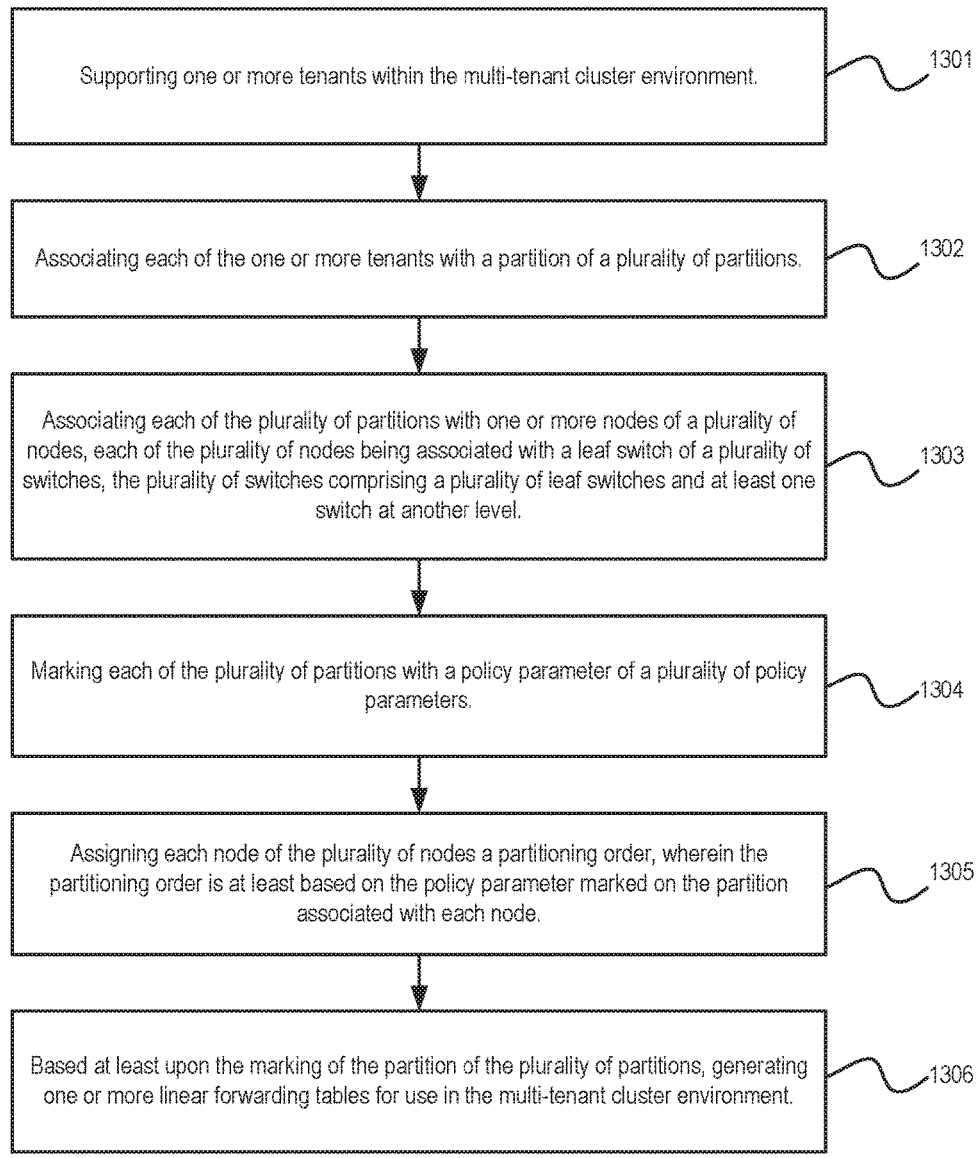
FIG. 13 is a flow chart of a method for supporting network isolation in a multi-tenant cluster environment, in accordance with an embodiment

FIG. 13 is a flow chart of a method for supporting network isolation in a multi-tenant cluster environment, in accordance with an embodiment.

At step 1301, the method can support one or more tenants within the multi-tenant cluster environment.

At step 1302, the method can associate each of the one or more tenants with a partition of a plurality of partitions.

At step 1303, the method can associate each of the plurality of partitions with one or more nodes of a plurality of nodes, each of the plurality of nodes being associated with a leaf switch of a plurality of switches, the plurality of switches comprising a plurality of leaf switches and at least one switch at another level.

At step 1304, the method can mark each of the plurality of partitions with a policy parameter of a plurality of policy parameters.

At step 1305, the method can assign each node of the plurality of nodes a partitioning order, wherein the partitioning order is at least based on policy parameter marked on the partition associated with each node.

At step 1306, based at least upon the marking of the partition of the plurality of partitions, the method can generate one or more linear forwarding tables for use in the multi-tenant cluster environment.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting network isolation in a multi-tenant cluster environment, comprising:
    supporting one or more tenants within the multi-tenant cluster environment;
    associating each of the one or more tenants with a partition of a plurality of partitions;
    associating each of the plurality of partitions with one or more nodes of a plurality of nodes, each of the plurality of nodes being associated with a leaf switch of a plurality of switches, the plurality of switches comprising a plurality of leaf switches and at least one switch at another level;
    marking each of the plurality of partitions with a policy parameter of a plurality of policy parameters;
    assigning each node of the plurality of nodes a partitioning order, wherein the partitioning order is at least based on the policy parameter marked on the partition associated with each node; and
    based at least upon the marking of the partition of the plurality of partitions, generating one or more linear forwarding tables for use in the multi-tenant cluster environment.

2. The method of claim 1, further comprising:
    marking each of the plurality of partitions with a global policy parameter.

3. The method of claim 1, wherein the plurality of policy parameters comprises:
    a strict parameter,
    a strict virtual lane parameter, and
    a best effort parameter.

4. The method of claim 3, wherein a partitioning order of a node associated with a partition marked with a strict parameter is before a partitioning order of a node associated with a partition marked with a strict virtual lane parameter, and wherein a partitioning order of a node associated with a partition marked with a strict virtual lane parameter is before a partitioning order of a node associated with a partition marked with a best effort parameter.

5. The method of claim 4, wherein generating one or more linear forwarding tables comprises:
    ordering, for each of the plurality of leaf switches, the plurality of nodes according to the partitioning order associated of each node; and
    routing, in the order of nodes, the plurality of end nodes, the routing comprising:
        selecting at least one down-going port and at least one up-going port for each node.

6. The method of claim 5, wherein the routing, in the order of nodes, the plurality of end nodes provides for strict isolation for those nodes associated with a partition marked with a strict parameter.

7. The method of claim 6, wherein the routing, in the order of nodes, the plurality of end nodes provides for isolation on virtual lanes for those nodes associated with a partition marked with a strict virtual lane parameter.

8. A system supporting network isolation in a multi-tenant cluster environment, the system comprising:
    one or more microprocessors; and
    a processor, running on the one or more microprocessors, wherein the processor operates to perform steps comprising:
        supporting one or more tenants within the multi-tenant cluster environment;
        associating each of the one or more tenants with a partition of a plurality of partitions;
        associating each of the plurality of partitions with one or more nodes of a plurality of nodes, each of the plurality of nodes being associated with a leaf switch of a plurality of switches, the plurality of switches comprising a plurality of leaf switches and at least one switch at another level;
        marking each of the plurality of partitions with a policy parameter of a plurality of policy parameters;
        assigning each node of the plurality of nodes a partitioning order, wherein the partitioning order is at least based on the policy parameter marked on the partition associated with each node; and
        based at least upon the marking of the partition of the plurality of partitions, generating one or more linear forwarding tables for use in the multi-tenant cluster environment.

9. The system of claim 8, wherein the processor operates to perform further steps comprising:
    marking each of the plurality of partitions with a global policy parameter.

10. The system of claim 8, wherein the plurality of policy parameters comprises:
    a strict parameter,
    a strict virtual lane parameter, and
    a best effort parameter.

11. The system of claim 10, wherein a partitioning order of a node associated with a partition marked with a strict parameter is before a partitioning order of a node associated with a partition marked with a strict virtual lane parameter, and wherein a partitioning order of a node associated with a partition marked with a strict virtual lane parameter is before a partitioning order of a node associated with a partition marked with a best effort parameter.

12. The system of claim 11, wherein generating one or more linear forwarding tables comprises:
    ordering, for each of the plurality of leaf switches, the plurality of nodes according to the partitioning order associated of each node; and
    routing, in the order of nodes, the plurality of end nodes, the routing comprising:

selecting at least one down-going port and at least one up-going port for each node.

13. The system of claim 12, wherein the routing, in the order of nodes, the plurality of end nodes provides for strict isolation for those nodes associated with a partition marked with a strict parameter.

14. The system of claim 13, wherein the routing, in the order of nodes, the plurality of end nodes provides for isolation on virtual lanes for those nodes associated with a partition marked with a strict virtual lane parameter.

15. A non-transitory machine readable storage medium having instructions stored thereon for supporting network isolation in a multi-tenant cluster environment that when executed cause a system to perform steps comprising:
   supporting one or more tenants within the multi-tenant cluster environment;
   associating each of the one or more tenants with a partition of a plurality of partitions;
   associating each of the plurality of partitions with one or more nodes of a plurality of nodes, each of the plurality of nodes being associated with a leaf switch of a plurality of switches, the plurality of switches comprising a plurality of leaf switches and at least one switch at another level;
   marking each of the plurality of partitions with a policy parameter of a plurality of policy parameters;
   assigning each node of the plurality of nodes a partitioning order, wherein the partitioning order is at least based on the policy parameter marked on the partition associated with each node; and
   based at least upon the marking of the partition of the plurality of partitions, generating one or more linear forwarding tables for use in the multi-tenant cluster environment.

16. The non-transitory machine readable storage medium of claim 15, the steps further comprising:
   marking each of the plurality of partitions with a global policy parameter.

17. The non-transitory machine readable storage medium of claim 15, wherein the plurality of policy parameters comprises:
   a strict parameter,
   a strict virtual lane parameter, and
   a best effort parameter.

18. The non-transitory machine readable storage medium of claim 17, wherein a partitioning order of a node associated with a partition marked with a strict parameter is before a partitioning order of a node associated with a partition marked with a strict virtual lane parameter, and wherein a partitioning order of a node associated with a partition marked with a strict virtual lane parameter is before a partitioning order of a node associated with a partition marked with a best effort parameter.

19. The non-transitory machine readable storage medium of claim 18, wherein generating one or more linear forwarding tables comprises:
   ordering, for each of the plurality of leaf switches, the plurality of nodes according to the partitioning order associated of each node; and
   routing, in the order of nodes, the plurality of end nodes, the routing comprising:
      selecting at least one down-going port and at least one up-going port for each node.

20. The non-transitory machine readable storage medium of claim 19, wherein the routing, in the order of nodes, the plurality of end nodes provides for strict isolation for those nodes associated with a partition marked with a strict parameter.

* * * * *

UNITED STATES PATENT AND TRADEMARK OFFICE
CERTIFICATE OF CORRECTION

| | | |
|---|---|---|
| PATENT NO. | : 10,187,310 B2 | Page 1 of 1 |
| APPLICATION NO. | : 15/182383 | |
| DATED | : January 22, 2019 | |
| INVENTOR(S) | : Zahid et al. | |

It is certified that error appears in the above-identified patent and that said Letters Patent is hereby corrected as shown below:

In the Specification

In Column 2, Line 47, delete "embodiment" and insert -- embodiment. --, therefor.

In Column 5, Line 66, delete "Wth" and insert -- With --, therefor.

Signed and Sealed this
Seventh Day of January, 2020

Andrei Iancu
*Director of the United States Patent and Trademark Office*